United States Patent [19]

Saarela et al.

[11] Patent Number: 4,740,100
[45] Date of Patent: Apr. 26, 1988

[54] ATTACHMENT LUG ADAPTED TO BE FIXED TO AN END OF A CYLINDRICAL BODY, SUCH AS A POWER CYLINDER, AND ASSEMBLY

[75] Inventors: Olli Saarela, Vantaa; Vesa Helske; Erkki Haapanen, both of Kuorevesi, all of Finland

[73] Assignee: Valmet Oy, Finland

[21] Appl. No.: 916,700

[22] Filed: Oct. 8, 1986

[30] Foreign Application Priority Data

May 20, 1986 [FI] Finland .................................. 862118

[51] Int. Cl.$^4$ ............................................... F16D 1/00
[52] U.S. Cl. ...................................... 403/24; 403/334; 403/270; 244/100 R
[58] Field of Search .................. 403/24, 361, 270, 271, 403/272, 334, 335, 305, 314, 358; 244/100 R, 102 R, 102 A

[56] References Cited

U.S. PATENT DOCUMENTS

| | | | |
|---|---|---|---|
| 2,024,445 | 12/1935 | Galehouse | 403/270 X |
| 2,313,242 | 3/1943 | Johnson | 244/102 R |
| 2,967,033 | 1/1961 | Langdon | 244/102 R |
| 2,982,499 | 5/1961 | Cameron-Johnson | 244/102 R |
| 3,718,967 | 3/1973 | Steven | 403/314 X |
| 3,807,668 | 4/1974 | Whitener | 244/102 R X |
| 4,211,589 | 7/1980 | Fisher et al. | 403/270 X |

FOREIGN PATENT DOCUMENTS 2728306  1/1978  Fed. Rep. of Germany ...... 403/270

*Primary Examiner*—Andrew V. Kundrat
*Attorney, Agent, or Firm*—Steinberg & Raskin

[57] ABSTRACT

An attachment lug is fixed to the end region of a cylindrical body, such as a power cylinder, a piston-cylinder combination or the like, to form an assembly wherein loads directed on the attachment lug are transmitted to the cylindrical member. The attachment lug comprises a fork portion of shell-type design on which a first conical surface is formed. A second conical surface is formed on an end region of the cylindrical member, the first and second conical surfaces having corresponding configurations adapted to mate with each other. The attachment lug is connected to the end region of the cylindrical member with the first and second conical surfaces mating with each other, the first and second conical surfaces being joined to each other by a bonding agent. The shell-like fork portion of the attachment lug is formed of a composite material, such as a thermosetting plastic reinforced by a continuous fiber structure.

18 Claims, 3 Drawing Sheets

ATTACHMENT LUG ADAPTED TO BE FIXED TO AN END OF A CYLINDRICAL BODY, SUCH AS A POWER CYLINDER, AND ASSEMBLY

BACKGROUND OF THE INVENTION

The present invention relates in general to an attachment lug adapted to be fixed to an end region of a cylindrical body or member such as a power cylinder so that loads directed on the attachment lug are transmitted to the cylindrical body, and to an assembly of the attachment lug connected to the cylindrical body.

In particular, the invention relates to an attachment lug adapted to be fixed on the end region of a cylindrical body or member which is suitable for use as a fork structure in the landing gear of aircraft. Such apparatus operate under high stresses and rigorous conditions and for this reason must possess good strength characteristics. Additionally, the apparatus must be lightweight. In the following description, the invention is described in connection with its application to aircraft landing gear wherein both of the characteristics mentioned above are required.

Generally, the landing gear of an aircraft enables the aircraft to operate on the ground. The landing gear is therefore subjected to extremely high stress conditions. The landing gear performs four functions and therefore must be designed with these functions in mind. In particular, firstly, the landing gear must serve as a static support for the aircraft when the aircraft is on the ground. Secondly, the landing gear enables the aircraft to taxi on the ground during take-off and landing. Thirdly, the landing gear must be capable of absorbing the vertical kinetic energy of the aircraft during landing. Finally, the landing gear must operate as a suspension and shock damping element in order to absorb impact forces which are directed on it as the aircraft moves over the ground due to bumps and other discontinuities in the ground. The landing gear of an aircraft generally comprises in its entirety wheels, brakes, a shock absorber unit and the necessary structural components by which these elements are joined to the structure of the aircraft.

The shock absorbing function of most conventional aircraft landing gears is performed by a component which operates in accordance with the oleo-pneumatic principle. Such landing gears are considered to absorb vertical energy most efficiently for a given weight and size. In such landing gears, the shock absorbing component comprises a piston-cylinder combination which is partially filled with hydraulic fluid and partially with air or nitrogen gas. The piston and cylinder are adapted to move with respect to each other, usually by means of slide bearings. During landing of the aircraft, the vertical energy is absorbed as the piston, while sliding inwardly into the cylinder, forces the hydraulic fluid to flow through an orifice from one chamber in the cylinder to another. In certain landing gears of this type the flow through the orifice is controlled by means of a metering pin.

The piston-cylinder component of the landing gear usually functions not only as a shock absorbing component but also as a structural component of the landing gear. Other structural components of the landing gear include the fork, the trunnion, and torque links that prevent the wheel from freely castering. The trunnion is connected to the main aircraft structure by pivot pins or the like. In other types of landing gears, a separate component connected to the piston-cylinder or to the trunnion functions as the main structural component. In certain aircraft using this type of landing gear, this separate component comprises an actuator which is part of the landing gear retracting mechanism.

The components of conventional oleo-pneumatic landing gears are generally formed of metallic material. The fork, piston, cylinder and trunnion are usually made of steel while the torque links are usually made of aluminum or steel. A significant drawback of such metallic construction is the weight of the landing gear which reduces the load capacity of the aircraft. Of course, it is desireable to maximize the load-carrying capacity of an aircraft from an economic viewpoint.

Although conventional landing gears have the general construction described above, the landing gear of one type of aircraft will generally differ in detailed construction from the landing gear of another aircraft, mainly due to the restricted space within which the landing gear must be provided and due to the location of the points at which the landing gear is connected to the aircraft structure. In many types of landing gears, the cylinder and the trunnion including the lugs are manufactured from a single forging. Depending on the particular design, the fork of the landing gear is either a full fork or a semi-fork. In some types of landing gears, the wheels, tires and brakes are situated on one side of the vertical axis of the landing gear in which case no fork is required at all.

SUMMARY OF THE INVENTION

It is an object of the present invention to provide new and improved attachment lugs adapted to be fixed to an end of a cylindrical body, such as a power cylinder.

Another object of the present invention is to provide a new and improved assembly including an attachment lug connected to a cylindrical member, such as a power cylinder, wherein loads directed on the attachment lug are transmitted to the cylindrical member.

Still another object of the present invention is to provide a new and improved attachment lug and a new and improved assembly including an attachment lug and a cylindrical member, such as a power cylinder suitable for use as the fork structure in aircraft landing gears.

Briefly, in accordance with the present invention, these and other objects are attained by providing an attachment lug including a fork having a shell-type design or structure on which a first conical surface is formed, a cylindrical member, such as a power cylinder or piston-cylinder combination, having an end region on which a second conical surface is formed having a configuration that corresponds to that of the first conical surface, the attachment lug being connected to the end region of the cylindrical member with the first and second conical surfaces mating with each other and joined to each other by a bonding agent.

As used herein, the terms "shell-type structure", "shelltype design" and the like means a convex, dome-like structure or design such as, but not limited to, the type presenting a surface of revolution, e.g., a hyperboloid, spherical section or hyperboloid.

The advantage of the invention over conventional constructions is the low weight of the structure. As noted above, a lighter landing gear is more economically efficient than heavier ones. Smaller aircraft in particular are widely used to transport freight, such as mail and the like, for which freight rates are high. Large economic savings are then achieved by even minor reductions in the weight of the aircraft itself.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
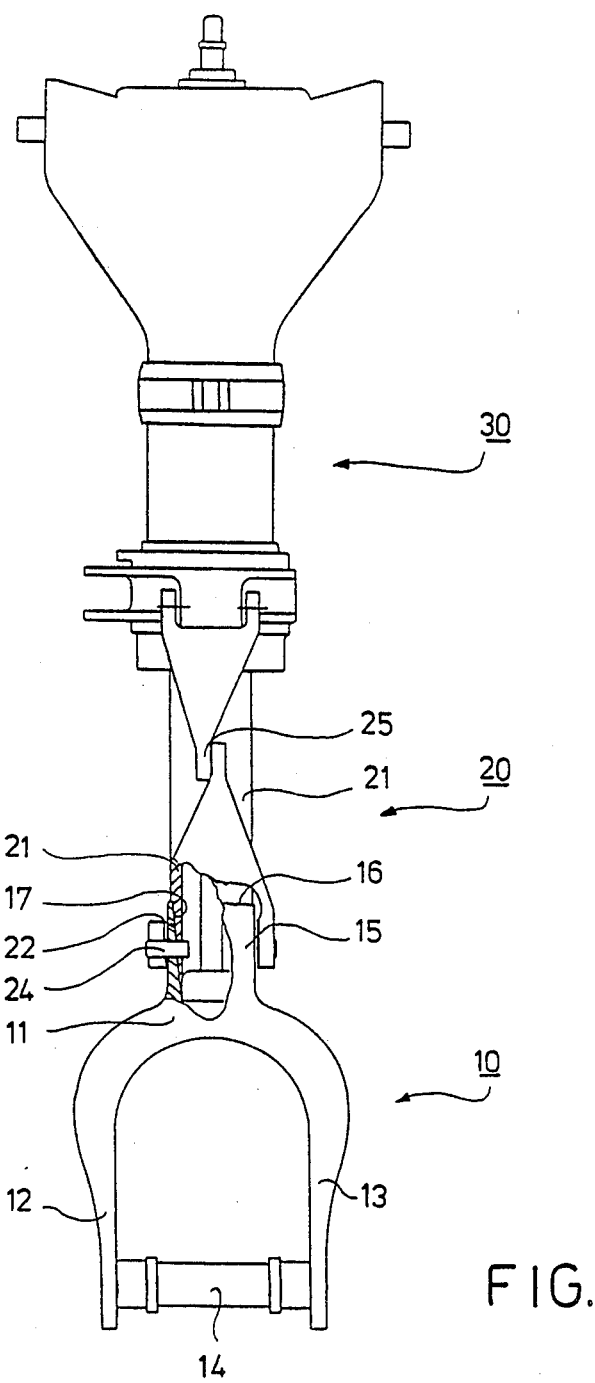
FIG. 1 is a front elevation view, partly in section, of an assembly including an attachment lug connected to the end region of a power cylinder in an aircraft landing gear in accordance with the present invention.
Figure 2:
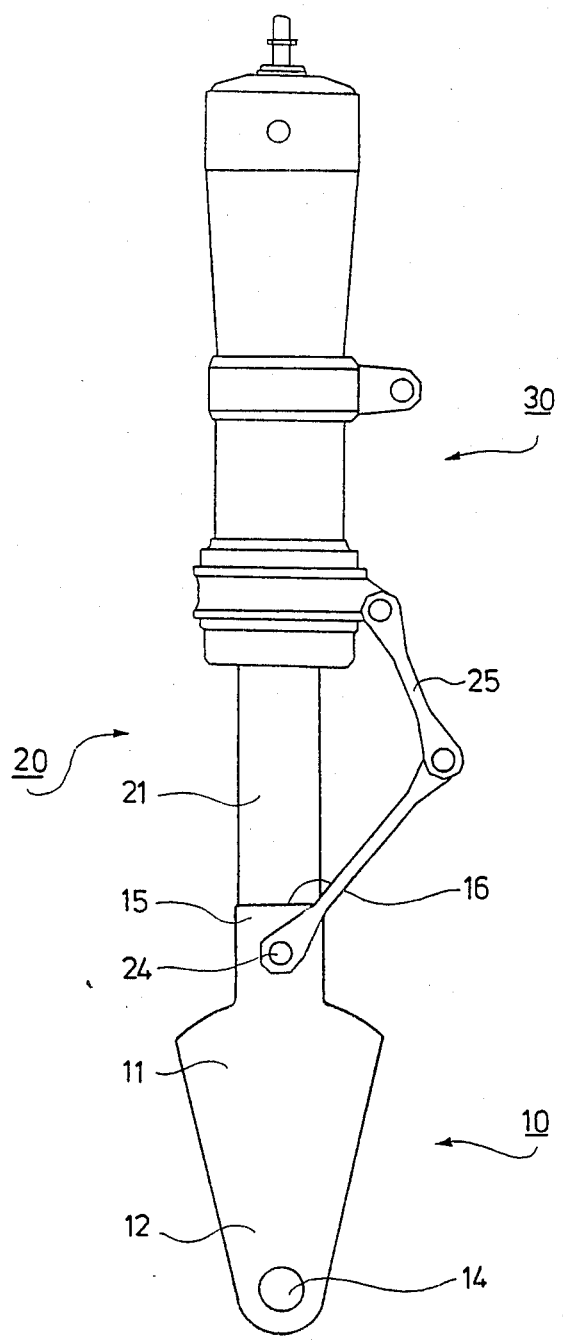
FIG. 2 is a side elevation view of the apparatus illustrated in FIG. 1.
Figure 3:
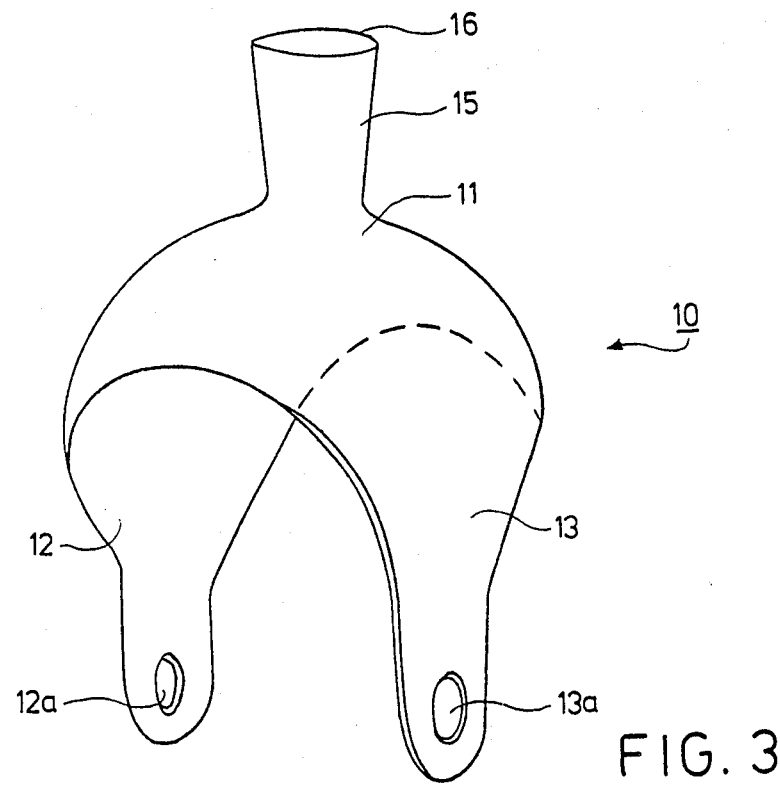
FIG. 3 is a schematic perspective view illustrating an attachment lug in accordance with the present invention.

Referring now to the drawings wherein like reference characters designate identical or corresponding parts throughout the several views, an attachment lug in accordance with the invention is generally designated 10. Referring to FIGS. 1 and 2, a cylindrical body or member 20 to which the attachment lug 10 is connected is shown as a tubular member 21 comprising the piston component of a piston-cylinder which functions as the shock absorber in the aircraft landing gear.

In the illustrated embodiments, the attachment lug 10 comprises a fork 11 of the landing gear. The fork 11 has a shell-type structure, i.e., a sheet-like structure shaped to be curved in a suitable manner. In other words, the fork 11 has a convex or dome-like structure. A projection 15 protrudes from the shell-like surface of the fork 11 on which a first conical surface 17 is formed. In the illustrated embodiment, the first conical surface 17 comprises an inwardly directed conical surface tapering from the end 16 of the sleeve-like projection 15 toward the fork 11 of attachment lug 10.

A second conical surface 22 is formed on the end region of the tubular member or piston 21 of the cylindrical body 20. The second conical surface 22 is an outwardly directed conical surface that tapers towards the end of the tubular member 21. The first and second conical surfaces 17 and 22 have corresponding configurations adapted to mate with each other in a tight fitting joint. In order to insure a reliable and rigid connection of the attachment lug 10 to the end of the cylindrical member 20, the conical surfaces 17 and 22 are bonded to each other by a bonding agent. As a result, the loads and stresses that are directed on the attachment lug 10 are transmitted from the attachment lug to the cylindrical member through the wedge-action provided by the surface contact between the first and second conical surfaces 17 and 22 and by the bonded joint formed therebetween.

In accordance with the invention, attachment lug 10 is formed of a composite material, i.e., a compound material formed of at least two components that are not dissolved in or fused with each other when combined. For example, reinforced plastics comprises one group of composite materials. Indeed, a preferred material from which the attachment lug 10 is formed comprises plastic reinforced with continuous fibers which are suitably oriented to carry the loads acting on the attachment lug.

The cylindrical member 20 which in the illustrated embodiment comprises the piston component of a power cylinder is also preferably formed of composite material. In the case where the composite material comprises fiber-reinforced plastic, the fibers must have a high tensile strength and modulus of elasticity. Continuous fibers formed of graphite can be advantageously utilized in the reinforced plastic material. Staple fibers, for example, are not suitable for use in the invention since such fibers do not possess the required continuity. Other examples of continuous fibers which may be used to reinforce the plastic material and that have sufficient strength and modulus of elasticity include, for example, fibers formed of glass and fibers formed of aramid.

The plastic used in the composite material should be a thermosetting plastic, i.e., a plastic that becomes crosslinked as it is cured and which cannot be reshaped after curing. An example of a suitable thermosetting plastic is epoxy, although other thermosetting plastics having equivalent characteristics may be used.

The reinforcing fiber used in the composite material preferably is in the form of a fabric and/or braiding. The fabric and/or braiding may be either dry, i.e., non-pretreated, or preimpregnated with a reinforcing material, such as a synthetic resin, to improve the adhesion of the fabric to the plastic material.

The landing gear illustrated in FIGS. 1 and 2 include a torque link structure 25 and a cylinder component 30 that cooperates with the tubular member or piston 21, as is conventional. The torque link structure 25 functions to maintain the tubular member or piston component 21 and the cylinder component 30 in rotatably fixed positions with respect to each other without restraining their relative axial movement. In the embodiments of FIGS. 1 and 2, the torque link structure 25 includes pivot pins 24 which extend through the first and second conical surfaces 17 and 22 and through the bonded joint between them. Pins 24 thereby also function as a mechanical connection between the first and second conical surfaces 17 and 22 to enhance the reliability of the connection between the attachment lug and tubular member 21.

As noted above, in the illustrated embodiment the first conical surface 17 formed on the sleeve-like projection 15 of the attachment lug 10 is an inner conical surface while the second conical surface 22 formed on the tubular member 21 comprises an outer conical surface. It should be understood that the disposition of the conical surfaces may be reversed from that shown in the illustrated embodiment. It is, however, essential that the conical surfaces provided on the attachment lug and cylindrical member have corresponding mating configurations and are joined to each other by bonding.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. An assembly wherein loads directed on an attachment lug are transmitted to a cylindrical member, such as a power cylinder, a piston-cylinder combination or the like, in a direction towards and substantially parallel to a longitudinal axis of said cylindrical member, comprising:

an attachment lug including a shell-type portion having a curved sheet-like structure defining a fork at one end thereof and a sleeve portion integral with and projecting from said shell-type portion in a direction away from said fork, said projecting sleeve portion having a first conical surface formed on a free end region thereof; and a cylindrical member having an end region on which a second conical surface is formed, said first and second conical surfaces having corresponding configurations adapted to mate with each other;

said free end region of said projecting sleeve portion of said attachment lug being connected to said end region of said cylindrical member with said first and second conical surfaces mating with each other; and said first and second conical surfaces being joined to each other by a bonding agent.

2. The assembly of claim 1 wherein said cylindrical member comprises a cylinder of a power cylinder.

3. The assembly of claim 1 wherein said first conical surface is an inwardly directed conical surface and said second conical surface is an outwardly directed conical surface.

4. The assembly of claim 1 wherein said attachment lug formed of composite material.

5. The assembly of claim 4 wherein said composite material comprises plastic reinforced with continuous fibers.

6. The assembly of claim 5 wherein said plastic is a thermosetting plastic.

7. The assembly of claim 6 wherein said thermosetting plastic comprises epoxy.

8. The assembly of claim 5 wherein said continuous fibers are in the form of a fabric.

9. The assembly of claim 5 wherein said continuous fibers are in the form of a braiding.

10. The assembly of claim 5 wherein said continuous fibers are formed of graphite.

11. The assembly of claim 5 wherein said continuous fibers are formed of glass.

12. The assembly of claim 5 wherein said continuous fibers are aramid fibers.

13. The assembly of claim 5 wherein said cylindrical member is also formed of plastic reinforced with continuous fibers.

14. An attachment lug adapted to be connected to an end region of a cylindrical member, such as a power cylinder, wherein loads directed on the attachment lug are transmitted to the cylinder member in a direction towards and substantially parallel to a longitudinal axis of the cylindrical member, comprising:

a shell-type portion having a curved sheet-like structure having a pair of depending legs extending in a first direction in substantially opposed, parallel relationship and a sleeve portion integral with and projecting from said shell-type portion in a second direction opposite from said first direction, said projecting sleeve portion having a conical surface formed on a free end thereof.

15. The lug of claim 14 wherein said attachment lug is formed of composite material.

16. The combination of claim 15 wherein said composite material comprises plastic reinforced with continuous fibers.

17. The lug of claim 16 wherein said plastic is a thermosetting plastic.

18. The combination of claim 16 wherein said continuous fibers are in the form of a fabric.

* * * * *